United States Patent
Rustomji et al.

(10) Patent No.: US 10,784,532 B2
(45) Date of Patent: Sep. 22, 2020

(54) CHEMICAL FORMULATIONS FOR ELECTROCHEMICAL DEVICE

(71) Applicants: SOUTH 8 TECHNOLOGIES, INC., San Diego, CA (US); THE REGENTS OF THE UNIVERSITY OF CALIFORNIA, Oakland, CA (US)

(72) Inventors: Cyrus Sam Rustomji, San Diego, CA (US); Yangyuchen Yang, La Jolla, CA (US); Daniel Davies, San Diego, CA (US); Jungwoo Lee, San Diego, CA (US); Ying Shirley Meng, San Diego, CA (US)

(73) Assignees: South 8 Technologies, Inc., San Diego, CA (US); The Regents of the University of California, Oakland, CA (US)

( * ) Notice: Subject to any disclaimer, the term of this patent is extended or adjusted under 35 U.S.C. 154(b) by 0 days.

(21) Appl. No.: 16/666,131

(22) Filed: Oct. 28, 2019

(65) Prior Publication Data

US 2020/0067130 A1     Feb. 27, 2020

Related U.S. Application Data

(63) Continuation of application No. PCT/US2019/032414, filed on May 15, 2019.

(60) Provisional application No. 62/673,752, filed on May 18, 2018, provisional application No. 62/749,046, filed on Oct. 22, 2018.

(51) Int. Cl.

| | |
|---|---|
| *H01M 10/0525* | (2010.01) |
| *H01M 10/0567* | (2010.01) |
| *H01M 10/0569* | (2010.01) |
| *H01G 11/60* | (2013.01) |
| *H01G 11/64* | (2013.01) |
| *H01G 11/78* | (2013.01) |

(52) U.S. Cl.
CPC ........ *H01M 10/0525* (2013.01); *H01G 11/60* (2013.01); *H01G 11/64* (2013.01); *H01G 11/78* (2013.01); *H01M 10/0567* (2013.01); *H01M 10/0569* (2013.01); *H01M 2300/0028* (2013.01)

(58) Field of Classification Search
CPC ........ H01M 10/0525; H01M 10/0569; H01M 10/0567; H01M 2300/0028; H01G 11/60; H01G 11/78; H01G 11/64
See application file for complete search history.

(56) References Cited

U.S. PATENT DOCUMENTS

| | | | |
|---|---|---|---|
| 2,310,080 A | 2/1943 | Hill | |
| 3,540,929 A | 11/1970 | Carlson | |
| 4,460,666 A | 7/1984 | Dinkler | |
| 5,011,751 A * | 4/1991 | Yoneyama | ........... C08G 61/123 429/247 |
| 5,213,908 A | 5/1993 | Hagedorn | |
| 5,702,845 A | 12/1997 | Kawakami et al. | |
| 5,753,389 A | 5/1998 | Gan et al. | |
| 5,770,033 A | 6/1998 | Murphy et al. | |
| 2001/0049051 A1 | 12/2001 | Jones | |
| 2004/0131934 A1 | 7/2004 | Sugnaux | |
| 2004/0258989 A1 | 12/2004 | Lee | |
| 2005/0016840 A1 | 1/2005 | Petillo | |
| 2007/0099089 A1 * | 5/2007 | Miura | ................... H01M 6/168 429/307 |
| 2011/0003207 A1 | 1/2011 | Oh | |
| 2011/0236766 A1 | 9/2011 | Kolosnitsyn | |
| 2012/0107650 A1 | 5/2012 | Kritzer | |
| 2012/0189937 A1 | 7/2012 | Dophle et al. | |
| 2015/0072248 A1 | 3/2015 | Watanabe | |
| 2016/0261005 A1 | 9/2016 | Rustomji et al. | |
| 2017/0346134 A1 | 11/2017 | Bandhauer | |
| 2018/0375156 A1 * | 12/2018 | Zhamu | ...................... C07C 9/04 |

FOREIGN PATENT DOCUMENTS

| | | |
|---|---|---|
| EP | 2144325 A1 | 1/2010 |
| JP | H1040958 A | 2/1998 |
| JP | 2015041526 A | 3/2015 |
| JP | 2016152231 A | 8/2016 |
| WO | 2015074006 A1 | 5/2015 |
| WO | 2017204984 A | 11/2017 |
| WO | WO2017204984 | 11/2017 |

OTHER PUBLICATIONS

International Search Report for PCT/US19/32414 dated Aug. 2, 2019.
International Search Report and Written Opinion for PCT Application No. PCT/US2019/032413, dated Jul. 30, 2019, 13 pages.
International Search Report and Written Opinion for PCT Application No. PCT/US2019/032414, dated Aug. 2, 2019, 16 pages.
International Search Report and Written Opinion for PCT Application No. PCT/US2017/029821, dated Sep. 7, 2017, 10 pages.
Abbott, et al., "Electrochemical investigations in liquid and supercritical 1,1,1 ,2-tetrafluoroethane (H FC 134a) and difluoromethane (HFC 32)," J. ElectroanaL Chern., vol. 457, 1998, pp. 1-4.
Bard, A., "New challenges in electrochemistry and electroanalysis," Pure & AppL Chem., vol. 64, 1992, pp. 185-192.
Bruno, et al., "Electrochemical Oxidation of C602+ and C603+", J. Am. Chem. Soc., vol. 125,2003, pp. 15738-15739.
Garcia, et al., "Electrochemistry in Liquid S02," J. Electrochem. Soc., vol. 137, 1990, pp. 2752-2759.
Iwama, et al., "Characterization of commercial supercapacitors for low temperature applications," J. Power Sources, vol. 219, 2012, p. 235-239.
Ke, et al., Electrodeposition of germanium from supercritical fluids: Phys. Chern. Chem. Phys., vol. 14,2012, pp. 1517-1528.

(Continued)

*Primary Examiner* — Muhammad S Siddiquee
(74) *Attorney, Agent, or Firm* — Manuel de la Cerra

(57) ABSTRACT

Chemical additives are disclosed to increase solubility of salts in liquefied gas electrolytes.

22 Claims, 10 Drawing Sheets

(56) References Cited

OTHER PUBLICATIONS

Simon, et al., "Materials for electrochemcial capacitors," Nature Materials, vol. 7, 2008, pp. 845-854.
Extended European Search Report for European Patent Application No. 14861242.7; dated Mar. 1, 2017.
Amatucci et al., "Fluoride based electrode materials for advanced energy storage devices," Journal of Fluorine Chemistry, 128, 243-262 (2007).
Liu et al., "Hllow Nanostructured Anode Materials for Li-Ion Batteries," Nanoscale Res Lett, 5:1525-1534 (2010) Abstract, p. 1525, col. 1-2.
Mukerjee, "Particle size and structural effects in platinum electrocatalysis," Journal of Applied Electrochemistry, 20, 537-548 (1990) p. 537, para 2.
Abbott, A. et al., "Conductivity of (C4H9)4N BF4 in Liquid and Supercritical Hydrofluorocarbons", J. Phys. Chern. B 2000, vol. 104, pp. 9351-9355.
Linden, D. et al., "The Lithium-Sulfur Dioxide Primary Battery—Its Characteristics, Performance and Applications", Journal of Power Sources, 1980, vol. 5, pp. 35-55.
West, w.e. et al., "Sulfuryl and Thionyl Halide-Based Ultralow Temperature Primary Batteries", Journal of the Electrochemical Society, 2010, vol. 157, pp. A571-A577.
International Search Report and Written Opinion for PCT Application No. PCT/US2014/66015, dated Apr. 13, 2015, 15 pages.

\* cited by examiner

Salt Solubility 0.1M LiTFSI in
Pure $SO_2F_2$ 0.1M LiTFSI in
$CH_3F$:$SO_2F_2$
1:1 vol 0.1M LiTFSI in
$CH_3F$:$SO_2F_2$
1:1 vol
w/ 0.1M THF
additive 0.1M LiTFSI in
$SO_2F_2$:$CH_3F$
1:9 vol
w/ 0.1M THF
additive

CHEMICAL FORMULATIONS FOR ELECTROCHEMICAL DEVICE

CROSS-REFERENCE TO RELATED APPLICATIONS

The present application claims priority as a continuation of PCT/US2019/032414 filed on May 15, 2019 which claims the benefit of priority to U.S. Provisional Application No. 62/673,752, filed May 18, 2018, and U.S. Provisional Application No. 62/749,046, filed Oct. 22, 2018, each of which are hereby incorporated by reference in their entirety.

This application is also related to PCT/US14/066015 filed on Nov. 17, 2014, U.S. application Ser. No. 15/036,763 filed on May 13, 2016, PCT/US17/29821 filed on Apr. 27, 2017, U.S. application Ser. No. 16/305,034 filed on Nov. 28, 2018, PCT/US2019/032413 filed on May 15, 2019, U.S. Provisional Application No. 62/673,792, filed May 18, 2018, and U.S. Provisional Application No. 61/972,101, filed Mar. 28, 2014, and U.S. Provisional Application No. 61/905,057, filed Nov. 15, 2013. The contents of each of these applications are hereby incorporated by reference in their entirety.

STATEMENT REGARDING FEDERALLY SPONSORED R&D

This invention was made with U.S. government support under grant 1721646 awarded by the U.S. National Science Foundation (NSF) and under contract NNX17CP67P awarded by the National Aeronautics and Space Administration (NASA). The U.S. government has certain rights in the invention.

FIELD OF THE INVENTION

Embodiments of the invention relate to compositions and chemical formulations of electrolytes for use in electrochemical energy devices, such as batteries and electrochemical capacitors. Devices using the compositions and methods of use of the compositions are also provided.

BACKGROUND

Electrochemical energy storage devices, such as batteries and double layer capacitors, utilize an ionic conducting electrolyte solution to carry charge between positive and negative electrodes. Typically, these electrolytes are a liquid at a standard room temperature of 20° C. and standard pressure (approximately 1.01325 bar). The electrolyte solutions use a mixture of some amount of solvent and salt and additional components, or additives, for improved electrochemical stability of the device. Common component additives include vinyl carbonate, fluoroethylene carbonate, lithium bis(oxalato)borate among others. Such additives help in surface modification of electrodes, safety aspects or in other useful ways. Solubility of salts is generally a function of the primary solvent, rather than additives.

SUMMARY

Embodiments of the present disclosure relate to chemical formulations, electrolyte compositions, electrochemical devices using thereof, and methods of use thereof. Some disclosed embodiments relate to novel formulations for electrolytes comprising a liquefied gas solvent.

One embodiment relates to a rechargeable electrochemical device that includes: an ionically conducting electrolyte comprising a liquefied gas solvent and one or more additives; a housing enclosing the ionically conducting electrolyte and structured to provide a pressurized condition to the liquefied gas solvent; and at least two conducting electrodes in contact with the ionically conducting electrolyte.

In some embodiments, the liquefied gas solvent is capable of being placed under a compressive pressure equal to, or greater than, the liquefied gas solvent's vapor pressure at room temperature when the compressive pressure is applied, thereby keeping the liquefied gas solvent in a liquid phase. In some embodiments, the liquefied gas solvent has a vapor pressure above an atmospheric pressure of 100 kPa at a room temperature of 293.15 K.

In some embodiments, the liquefied gas solvent comprises one or more materials selected from the group consisting of fluoromethane, difluoromethane, sulfuryl fluoride, sulfuryl chloride, carbon dioxide, 1,1-difluoroethane, chloromethane, and a combination thereof. In some embodiments, the liquefied gas solvent comprises fluoromethane and carbon dioxide. In some embodiments, the liquefied gas solvent comprises fluoromethane and sulfuryl fluoride. In some embodiments, the liquefied gas solvent comprises fluoromethane and difluoromethane. In some embodiments, the liquefied gas solvent comprises fluoromethane, difluoromethane, and carbon dioxide. In some embodiments, the liquefied gas solvent comprises fluoromethane, sulfuryl fluoride, and carbon dioxide. In some embodiments, the ratio of sulfuryl fluoride to fluoromethane is lower than 1:9. In some embodiments, the ratio of sulfuryl fluoride to carbon dioxide is about 1:1.

In some embodiments, the one or more gas, liquid, or solid additives are selected from the group consisting of non-cyclic carbonate, cyclic carbonate, non-cyclic ether, cyclic ether, nitrile, and a combination thereof. In some embodiments, the one or more additives comprises acetonitrile. In some embodiments, the one or more additives comprises tetrahydrofuran. In some embodiments, the one or more additives comprises dimethyl ether.

In some embodiments, the rechargeable electrochemical device further comprises one or more lithium salts. In some embodiments, the molar ratio of the one or more additives and one or more lithium salts is in the range from about 0.01 to about 10.

Another embodiment relates to a rechargeable lithium battery. The rechargeable lithium battery may include an ionically conducting electrolyte. The ionically conducting electrolyte may comprise a liquefied gas solvent. In some embodiments, the ionically conducting electrolyte may further comprise one or more gas, liquid, or solid additives, selected from the group consisting of non-cyclic carbonate, cyclic carbonate, non-cyclic ether, cyclic ether, nitrile, and combinations thereof. In some embodiments, the rechargeable lithium battery may also include a housing that encloses two conducting electrodes and the ionically conducting electrolyte. In some embodiments, the liquefied gas solvent has a vapor pressure above an atmospheric pressure of 100 kPa at a room temperature of 293.15 K. In some such embodiments, the liquefied gas solvent may be capable of being placed under a compressive pressure equal to, or greater than, the liquefied gas solvent's vapor pressure at room temperature when the compressive pressure is applied, thereby keeping the liquefied gas solvent in a liquid phase.

Alternative or additional embodiments described herein provide an electrolyte composition comprising one or more of the features of the foregoing description or of any description elsewhere herein.

Alternative or additional embodiments described herein provide a device comprising one or more of the features of the foregoing description or of any description elsewhere herein.

Alternative or additional embodiments described herein provide a method of using the electrolyte composition or device comprising one or more of the features of the foregoing description or of any description elsewhere herein.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

FIG. 1 illustrates that majority of salt is non-dissolved inside this solution of liquefied gas electrolyte.

FIG. 2 illustrates that the majority of salt is well-dissolved inside this solution of liquefied gas electrolyte.

DETAILED DESCRIPTION

Figure 1:
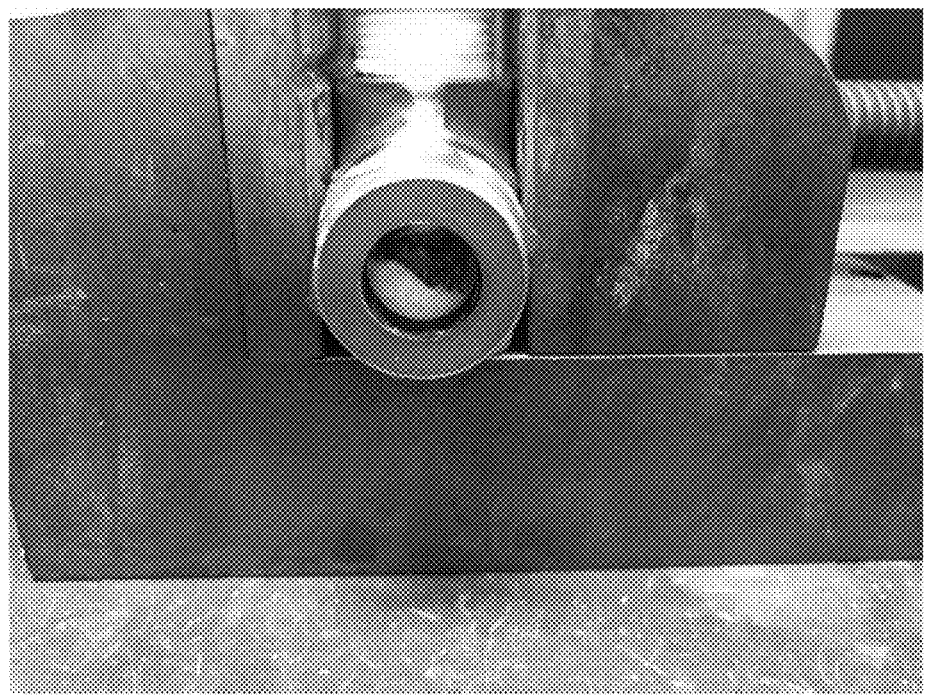
FIG. 1 shows a high-pressure window cell containing a mixture of 0.3 M LiTFSI (lithium bis(trifluoromethanesulfonyl)imide) salt in a fluoromethane liquefied gas solvent.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention, as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

One embodiment is an electrochemical device comprising an ionically conducting electrolyte and having one or more additives. The ionically conducting electrolyte may comprise one or more salts. The one or more additives may be liquid, solid, or gas at standard room temperature of +20° C. and standard pressure (approximately 1.01325 bar). The one or more salts may be liquid, solid, or gas at standard room temperature of +20° C. and standard pressure (approximately 1.01325 bar).

The ionically conducing electrolyte of the preceding paragraph may also comprise a solution of one or more solvents. The one or more solvents may be selected from the group consisting of liquefied gas solvents, liquid solvents, or solid solvents. One of skill in the art will understand the term "solid solvent" as referring to a solvent that is solid at room temperature and can form a liquid solution when mixed with other liquid or liquids. In some embodiments, the solution of one or more solvents may be a solution of one or more liquefied gas solvents. Each liquefied gas solvent solution is in a liquid-only phase, or in a combined gas-and-liquid phase at standard room temperature of +20° C. and standard pressure (approximately 1.01325 bar) while inside a mechanically rigid container housing the electrolyte. Because of the nature of the high vapor pressure electrolyte, some liquid component of the electrolyte may turn to a vapor component if the volume within the electrolyte housing allows. One or more liquid components may mix with one or more vapor components in equal or unequal ratio in both liquid and vapor states. This ratio of mixing may occur at any temperature or pressure. While any single component of liquefied gas solvents may have a vapor pressure above an atmospheric pressure at room temperature, the mixture of any number of liquefied gas solvents, any number of additives, any number of solvents, and any number of salts may also lower the vapor pressure of the full solution to below an atmospheric pressure at room temperature. The solution of one or more liquefied gas solvents may have a vapor pressure above or below an atmospheric pressure at room temperature.

The ionically conducing electrolyte may further comprise one or more additives (or additive components). The one or more additive components may be liquid, solid, or gas at standard room temperature of +20° C. and standard pressure (approximately 1.01325 bar). In one embodiment, the additive comprises tetrahydrofuran in equal molar ratio to the salt in a liquefied gas solvent solution such as fluoromethane with a LiTFSI salt.

Some such embodiments of electrochemical devices may further comprise a housing, enclosing the ionically conducting electrolyte and structured to provide a pressurized condition to the one or more salts and the solution of one or more solvents, such as liquefied gas solvents, and a pair of electrodes in contact with the ionically conducting electrolyte.

In some embodiments, the ionically conducting electrolyte may comprise lithium bis(trifluoromethanesulfonyl)imide salt. Such an ionically conducting electrolyte may comprise a solution of one or more liquefied gas solvents, comprising fluoromethane, difluoromethane, carbon dioxide, sulfuryl fluoride, or a combination thereof. In some such embodiments, the ionically conducting electrolyte may comprise one or more additives selected from the group consisting of tetrahydrofuran, acetonitrile, dimethyl ether, dimethoxyethane, and combinations thereof. In some embodiments, the electrochemical device is an electrochemical energy storage device as described in PCT/US2014/066015 and PCT/US2017/029821, which are incorporated by reference in their entireties. In some embodiments the electrochemical device is a rechargeable battery, ultracapacitor, or supercapacitor. The rechargeable battery may be a lithium ion battery or a lithium metal battery.

One of skill in the art will understand that the terms "one or more salts," "one or more solvents" (including "liquefied gas solvents" and "liquid solvents"), and "one or more additives," as used herein in connection with "the ionically conducting electrolytes," refer to one or a plurality of electrolyte components.

In some embodiments, the ionically conducting electrolyte can be composed of solvents and salts, wherein the solvents further comprise only materials which are gaseous under standard conditions. In some embodiments, the materials included fluoromethane, difluoromethane and carbon dioxide. In some embodiments, additional additives are used that provide a beneficial use as it relates to improved salt solubility and other device performance in solution. Embodiments relate to material additives, which increase the solubility and other device performance of an electrolyte salt component. For instance, without such additives, the solubility of the salt may be limited. However, with such additives included in the device, solubility and performance are increased as related to electrolyte conductivity, efficiency, and temperature performance. Here, additives may be treated as an additional component to the overall solvent solution.

Salt solubility is primarily a function of the binding energy between positively and negatively charged ions, binding energy between positively charged ions and the solvent, and binding energy between negatively charged ions and the solvent. These binding energies are a function of temperature and the particular ions and solvents in solution. When binding energy between positively and negatively charged ions is low compared to binding energy between ions and solvent molecules, the salt has higher solubility within the solvent. This is due to the solvent's ability to effectively separate the positively and negatively charged ions and overcome their respective coulombic attraction, which allows ions to solubilize in solution without coming into contact with oppositely charged ions in solution. When binding energy between positively and negatively charged ions is high compared to binding energy between ions and solvent molecules, the salt has lower solubility within the solvent. This is due to the solvents inability to effectively separate the positively and negatively charged ions to overcome their respective coulombic attraction, which results in positive and negative ions coming into contact and separating out of solution, lowering overall solubility.

Figure 8:
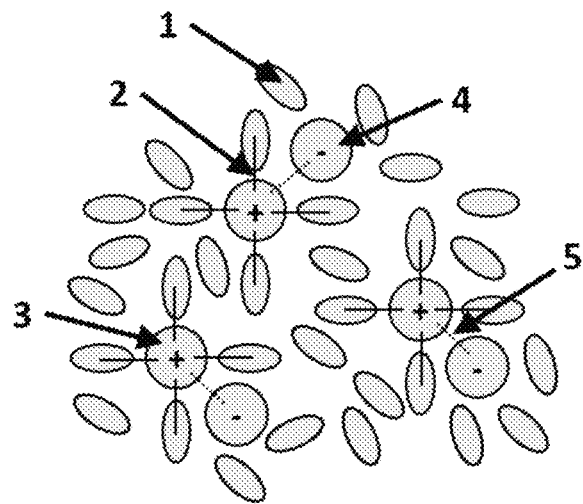
FIG. 8 illustrates solvation in an exemplary solvent without an additive.

FIG. 8 demonstrates a situation where the binding energy between salt ions is larger than that between ions and solvent. In this example, solvent molecule 1 is generally attracted to positive ion 3, and so several solvent molecules 1 will form a solvation shell around positive ion 3. Binding energy of the negative ion and the solvent in this example is considered to be low, and therefore neglected here. In this example, four solvent molecules surround the ion in the immediate solvation shell. However, the binding energy between positive ion 3 and all the solvent molecules in the solvent shell is comparatively low to the binding energy between positive ion 3 and negative ion 4. The bindings between these molecules are represented by a solid line for binding between positive ion 3 and solvent 1, and by a dashed line for binding between positive ion 3 and negative ion 4. In this example, the summation of all binding energies with the solvent on a single positive ion represented by solid lines, is comparably lower than the binding energy between positive ion 2 and negative ion 4, represented by the dashed line. This allows the ions to stay in contact and lowers the solubility of the salt in solution.

Figure 9:
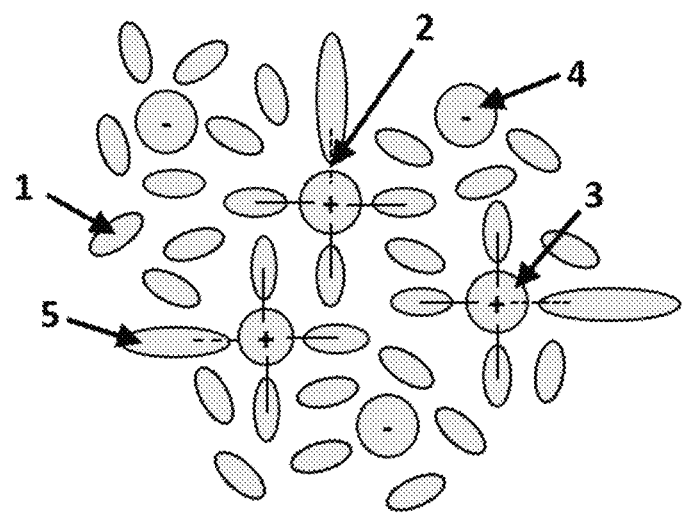
FIG. 9 illustrates solvation in an exemplary solvent with equal molar concentration additive to salt.
Figure 10:
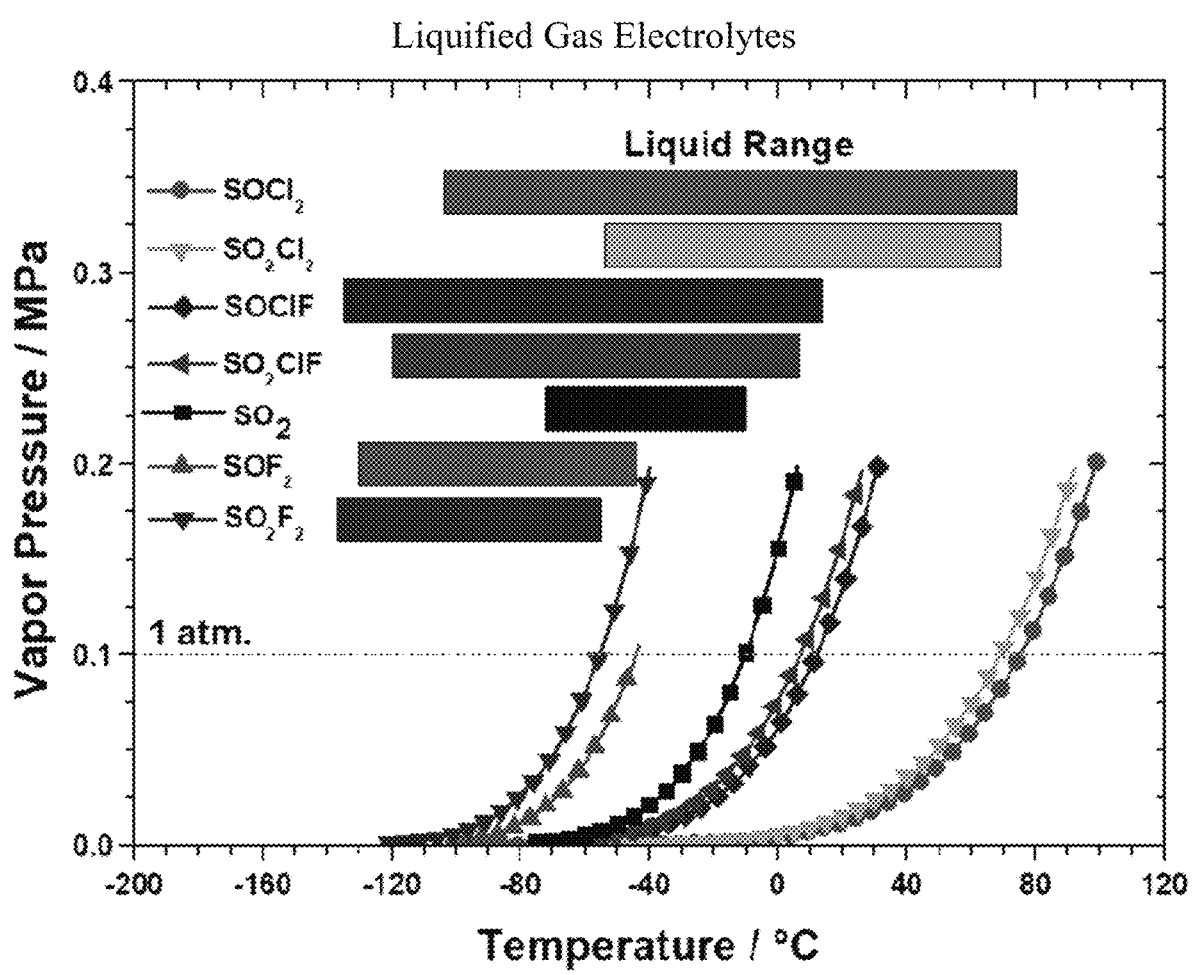
FIG. 10 compares vapor pressures of various sulfuryl halide or thionyl halide liquefied gas electrolytes.

FIG. 9 demonstrates a situation where the binding energy between salt ions is smaller than that between ions and solvent. In this example, solvent molecule 1 is generally attracted to positive ion 3, and so several solvent molecules 1 will form a solvation shell around positive ion 3. Binding energy of the negative ion and the solvent in this example is considered to be low, and therefore neglected here. In this example, the solvent solution is composed of an additional additive 5 in equal molar quantity as the salt. This additive has a higher binding energy with the positive ion 3 than does the other solvent molecule 1. The binding between solvent 1 and positive ion 3 is represented by a solid line, whereas binding between additive 5 and positive ion 1 is represented by long dash line 2. In this example, three solvent molecules 1 and one additive solvent molecule 5 will surround the positive ion. Again, the solvation shell is composed of four solvent molecules total around a single positive ion 3; however, now the solvent shell is composed of two different types of molecules. Now, the binding energy between the positive ion 3 and all the solvent molecules in the solvent shell is comparatively high relative to the binding energy between the positive ion 3 and the negative ion 4. In this example, the summation of all binding energies with the solvent on a single positive ion represented by solid lines and long dashed lines is comparably higher than the binding energy between positive ion 2 and negative ion 4, represented by the dashed line. This allows for increased separation between ions and higher solubility of the salt into solution.

Temperature has an influence on the binding energy of various materials and so solubility may increase or decrease with temperature. Further, although average binding energies of the ions comprising a salt may be higher or lower than average binding energies between ions and solvent molecules, random statistical fluctuations due to kinetic movement of molecules or alignment of molecules will generally show some minor solubility of components in solutions that are generally considered insoluble and generally show some minor salt precipitation in solutions that are generally considered soluble.

Frequently, ion aggregates are formed. This is when two or more ions of same or differing charge come into contact and form a stable particle in solution. For example, two positively charged ions and a single negatively charged aggregate may for a single larger positively charged ion. Further, a single ion may have double or triple charge, such as often seen with magnesium or aluminum ions. While they are composed of larger aggregates, these ions are often still soluble in solution and may contribute to electrolytic conductivity of the electrolyte solution.

One example of a salt with moderate solubility would be an electrolyte comprised of LiTFSI salt in fluoromethane and carbon dioxide solvent solution, which is a liquefied gas electrolyte. Since the binding energy of the solvent to the ions is comparably low to the binding energy of the Li cation and the TFSI anion, the LiTFSI salt has limited solubility in the solvent.

The present disclosure provides materials that may improve the solubility of such salts in liquefied gas electrolytes to improve performance of the device such as increasing conductivity or electrolyte to allow for higher power devices. Further, these additives may increase other performance metrics such as operation temperature or voltage or high energy electrode materials such as the lithium metal anode. One example discloses the use of tetrahydrofuran as an additive in equal molar ratio to the salt in a liquefied gas solvent solution such as fluoromethane with LiTFSI salt. The use of tetrahydrofuran increases the binding energy between the solvent solution and the salt ions as compared to a solution of only fluoromethane solution. This increased binding energy increases separation of the negatively charged TFSI anions and the positively charged Li cations, thus improving solubility of the salt into the solvent solution.

The increased number of ion carriers in the solution improves performance over a range of temperatures and on high-energy electrodes, such as the lithium metal anode. The additives may also form preferred electrode-electrolyte interfaces (solid electrolyte interface) with either the anode or cathode. These interfaces may be preferable due to the characteristics of a thinner interface or higher conduction or more stability over several cycles.

The above example uses equal molar concentration of additive and salt, though this is not a requirement. Additive concentration may be higher or lower than the concentration of the salt. Further, a combination of additives or salts may be used in any respective molar ratios. One advantage to limiting the additive concentration to less than or equal to the molar ratio of the salt is improved electrochemical stability of the additive. It has been shown in the literature that electrolyte solutions with high concentrations of salts show increased electrochemical stability. This is because most or all solvent molecules are strongly bound to a salt ion. This binding to a salt ion decreases the chemical reactivity of the solvent with the electrodes which causes decomposition. Generally, a free solvent molecule which is not bound to a salt ion will show decreased electrochemical stability. In one aspect of the present invention, an additive such as tetrahydrofuran is used in an equal molar concentration with LiTFSI in fluoromethane. Since fluoromethane is a solvent with excellent electrochemical stability, the tetrahydrofuran is the most likely component to first undergo decomposition at an electrode surface. However, since the tetrahydrofuran is in equal molar concentration with the salt, nearly all tetrahydrofuran molecules are bound to the salt component at all times. Much like the mentioned electrolyte solutions with high concentration of salt, the tetrahydrofuran-in-fluoromethane-based electrolyte behaves as if it is in a highly concentrated electrolyte since all tetrahydrofuran molecules are coordinated with or bound to a salt ion, thus lowering decomposition reactions with the electrodes and improving electrochemical stability. This results in a surprisingly stable electrolyte formulation, which resists both oxidation reactions at the cathode and reduction reactions at the anode.

Sometimes a mixture of one solvent and one additive with a salt will form a soluble and miscible solution. However, sometimes the addition of another solvent or additive causes the solution to separate and become non-miscible. An example of this would be the mixture of 0.3M LiTFSI and 0.3M tetrahydrofuran in liquefied gas fluoromethane, which shows good miscibility and solubility for all components. However, a mixture of 0.3M LiTFSI and 0.3M tetrahydrofuran in a solution of two parts by volume fluoromethane and one part by volume sulfuryl fluoride, also a liquefied gas solvent, shows a distinct separation of components from solution. There is a small separation volume, which is likely a highly concentrated salt in a mixture of tetrahydrofuran and fluoromethane with a second separated volume comprised of fluoromethane and sulfuryl fluoride. However, using dimethoxyethane in place of tetrahydrofuran shows a highly soluble and miscible solution of all components. Thus, certain additives may improve solubility of components in certain solutions.

Disclosed here are additives that may be used in liquefied gas electrolytes to improve salt solubility. In some embodiments, the additives are used in combination with fluoromethane as a primary solvent and lithium based salts. In some embodiments, other liquefied gas solvents such as difluoromethane, trifluoromethane, fluoroethane, tetrafluoroethane, pentafluoroethane, 1,1-difluoroethane, 1,2-difluoroethane, 1,1,1-trifluoroethane, 1,1,2-trifluoroethane, 1,1,1,2-tetrafluoroethane, 1,1,2,2-tetrafluoroethane, pentafluoroethane, chloromethane, chloroethane, thionyl fluoride, thionyl chloride fluoride, phosphoryl fluoride, phosphoryl chloride fluoride, sulfuryl fluoride, sulfuryl chloride fluoride, 1-fluoropropane, 2-fluoropropane, 1,1-difluoropropane, 1,2-difluoropropane, 2,2-fluoropropane, 1,1,1-trifluoropropane, 1,1,2-trifluoropropane, 1,2,2-trifluoropropane, fluoroethylene, cis-1,2-fluoroethylene, 1,1-fluoroethylene, 1-fluoropropylene, 2-propylene, chlorine, chloromethane, bromine, iodine, ammonia, nitrous oxide, molecular oxygen, molecular nitrogen, carbon monoxide, carbon dioxide, dimethyl ether, sulfur dioxide, carbon disulfide, hydrogen fluoride, hydrogen chloride or any combination thereof may also be used as liquefied gas solvent in combination with these additives. In some embodiments, the liquefied gas solvents can be fluoromethane. In some embodiments, the liquefied gas solvents can be difluoromethane. In some embodiments, the liquefied gas solvents can be chloromethane. In some embodiments, the liquefied gas solvents can be 1,1-difluoroethane. In some embodiments, the liquefied gas solvents can be sulfuryl fluoride. In some embodiments, the liquefied gas solvents can be thionyl chloride or thionyl fluoride. In some embodiments, the liquefied gas solvents can be selected from the group consisting of fluoromethane, difluoromethane, sulfuryl fluoride, chloromethane, carbon dioxide, 1,1-difluoroethane and any combination thereof. In some embodiments, the liquefied gas electrolyte includes a single liquefied gas solvent or a combination of liquefied gas solvents and one or more additive and one or more salt. These additives may be gaseous, liquid or solid at standard room temperature of +20° C. and standard pressure (approximately 1.01325 bar). Further, any of the gaseous additives may also be used as primary solvent. In some embodiments, the amount of the primary solvent or mixture of primary solvents is greater than about 10%, about 20%, about 30%, about 40%, about 50%, about 60%, about 70%, about 80%, about 90%, about 95%, about 98%, or about 99% by weight based on the total weight of the liquefied gas electrolyte. In some embodiments, the amount of the primary solvent is less than about 99%, about 98%, about 95%, about 90%, about 80%, about 70%, about 60%, about 50%, about 40%, about 30%, or about 20% by weight, based on the total weight of the liquefied gas electrolyte. In some embodiments, the amount of the additive is less than about 80%, about 70%, about 60%, about 50%, about 40%, about 30%, about 20%, about 10%, about 5%, about 2%, or about 1% by weight, based on the total weight of the liquefied gas electrolyte.

In some embodiments, the liquefied gas solvents comprise a mixture of two solvents. In some embodiments, the liquefied gas solvents comprise a mixture of three solvents. In some embodiments, the liquefied gas solvents comprise a mixture of four, five, six, seven, or more solvents. In some embodiments, the liquefied gas solvents comprise fluoromethane, sulfuryl fluoride, and carbon dioxide. In some embodiments, the liquefied gas solvents comprise fluoromethane and carbon dioxide. In some embodiments, the liquefied gas solvents comprise sulfuryl fluoride and carbon dioxide. In some embodiments, the liquefied gas electrolyte comprises of fluoromethane, difluoromethane, and carbon dioxide. In some embodiments, the liquefied gas solvents comprise halogenated hydrocarbon and sulfuryl halide. In some embodiments, the liquefied gas solvents comprise halogenated hydrocarbon, sulfuryl halide, and carbon dioxide. In some embodiments, the molar ratio of the additive to the salt is greater than about 0.01, about 0.05, about 0.1, about 0.2, about 0.30, about 0.5, about 0.7, about 0.9, about 0.95, about 0.98, about 1.0, about 1.05, about 1.1, about 1.5, about 2, about 3, about 5, about 10, or about 100. In some embodiments, having a lower molar concentration additive as compared to salt such of about 0.9, about 0.95, or about 0.98 may be favorable in order to guarantee that the majority of additive material in the electrolyte generally is binding or coordinated to an ion in the electrolyte, thus increasing electrochemical stability of the cell. In some embodiments, the molar ratio of the additive to the salt is less than 0.8, 0.85, 0.9, 0.95, 0.98, 0.99, 1.0, 1.1, 1.2, 1.3, 1.4, or 1.5. In some embodiments, the molar ratio of the additive to the salt is less than about 0.8, about 0.85, about 0.9, about 0.95, about 0.98, about 0.99, about 1.0, about 1.1, about 1.2, about 1.3, about 1.4, or about 1.5. In some embodiments, the molar ratio of the additive to the salt is in the ranges of about 0.5 to about 1.0, about 0.8 to about 0.98, about 0.9 to about 1.0, or about 0.9 to about 0.98. In some embodiments, having a higher molar concentration additive as compared to salt such of about 1.1, about 1.2, or about 2.0 may be favorable in order to guarantee maximum solubility of salt for improved performance due to higher number of ion charge carriers in solution. In some embodiments, multiple additives are used, each of which may have molar ratio to the salt is greater than about 0.01, about 0.05, about 0.1, about 0.2, about 0.30, about 0.5, about 0.7, about 0.9, about 0.95, about 0.98, about 1.0, about 1.05, about 1.1, about 1.5, about 2, about 3, about 5, about 10, or about 100. In some embodiments, the salt concentration in the electrolyte solution is greater than about 0.1, about 0.3, about 0.5, about 0.8, about 1.0, about 1.3, about 1.5, about 1.8, about 2.0, about 3.0, about 4.0, about 5.0, or about 8.0 moles per liter of solution.

In some embodiments, the liquefied gas electrolyte can include one or more additives. In some embodiments, the liquefied gas electrolyte can include one additive. In some embodiments, the liquefied gas electrolyte can include two, three, four, or more additives. In some embodiments, the additive can be a noncyclic carbonate, a cyclic carbonate, a non-cyclic ether, a cyclic ether, or a nitrile compound, or any combination thereof. In some embodiments, the additive is tetrahydrofuran. In another embodiment, the additive is acetonitrile. In another embodiment, the additive is dimethyl ether. In another embodiment, the additive is fluoroethylene carbonate. In another embodiment, the additive is dimethyl carbonate.

In one embodiment, the additive may be of a non-cyclic carbonate compound selected from the group consisting of dimethyl carbonate, ethyl methyl carbonate, propyl methyl carbonate, butyl methyl carbonate, diethyl carbonate, propyl ethyl carbonate, butyl ethyl carbonate, dipropyl carbonate, propyl butyl carbonate, dibutyl carbonate, fluoromethyl methyl carbonate, difluoromethyl methyl carbonate, trifluoromethyl methyl carbonate, bis(fluoromethyl) carbonate, bis(difluoromethyl) carbonate, bis(trifluoromethyl) carbonate, fluoromethyl ethyl carbonate, difluoromethyl ethyl carbonate, trifluoromethyl ethyl carbonate, fluoroethyl ethyl carbonate, difluoroethyl ethyl carbonate, trifluoroethyl ethyl carbonate, tetrafluoroethyl ethyl carbonate, pentafluoroethyl ethyl carbonate, hexafluoroethyl ethyl carbonate, bis(fluoroethyl) carbonate, bis(difluoroethyl) carbonate, bis(trifluoroethyl) carbonate, bis(tetrafluoroethyl) carbonate, bis(pentafluoroethyl) carbonate, bis(hexafluoroethyl) carbonate, and any combination thereof.

In another embodiment, the additive may be of a cyclic carbonate compound selected from the group consisting of vinyl carbonate, ethylene carbonate, propylene carbonate, 1,2-butylene carbonate, trans-butylene carbonate, fluoroethylene carbonate, difluoroethylene carbonate, trifluoroethylene carbonate, tetrafluoroethylene carbonate, chloroethylene carbonate, dichloroethylene carbonate, trichloroethylene carbonate, tetrachloroethylene carbonate, fluoromethyl ethylene carbonate, difluoromethyl ethylene carbonate, trifluoromethyl ethylene carbonate, bis(fluoromethyl) ethylene carbonate, bis(difluoromethyl) ethylene carbonate, bis(trifluoromethyl) ethylene carbonate, and any combination thereof.

In another embodiment, the additive may be of a non-cyclic ether compound selected from the group consisting of methyl propyl ether, methyl butyl ether, diethyl ether, ethyl propyl ether, ethyl butyl ether, dipropyl ether, propyl butyl ether, dibutyl ether, ethyl vinyl ether, divinyl ether, glyme, diglyme, triglyme, tetraglyme, 1,1,2,2-tetrafluoro-3-(1,1,2,2-tetrafluoroethoxy)-propane, trifluoro(trifluoromethoxy)methane, perfluoroethyl ether, fluoromethyl methyl ether, difluoromethyl methyl ether, trifluoromethyl methyl ether, bis(fluoromethyl) ether, bis(difluoromethyl) ether, fluoroethyl methyl ether, difluoroethyl methyl ether, trifluoroethyl methyl ether, bis(fluoroethyl) ether, bis(difluoroethyl) ether, bis(trifluoroethyl) ether, 2-fluoroethoxymethoxyethane, 2,2-difluoroethoxymethoxyethane, methoxy-2,2,2-trifluoroethoxyethane, ethoxy-2-fluoroethoxyethane, 2,2-difluoroethoxyethoxyethane, ethoxy-2,2,2-trifluoroethoxyethane, methyl nanofluorobutyl ether, ethyl nanofluorobutyl ether, 2-fluoroethoxymethoxyethane, 2,2-difluoroethoxymethoxyethane, methoxy-2,2,2-trifluoroethoxyethane, ethoxy-2-fluoroethoxyethane, 2,2-difluoroethoxyethoxyethane, ethoxy-2,2,2-trifluoroethoxyethane, bis(trifluoro)methyl ether, dimethyl ether, methyl ethyl ether, methyl vinyl ether, perfluoromethyl-vinylether, and any combination thereof.

In another embodiment, the additive may be of a cyclic ether compound selected from the group consisting of propylene oxide, tetrahydrofuran, tetrahydropyran, furan, 12-crown-4, 12-crown-5, 18-crown-6, 2-methyltetrahydrofuran, 1,3-dioxolane, 1,4-dioxolane, 2-methyloxolane, (1,2-propylene oxide), ethylene oxide, octafluorotetrahydrofuran, and any combination thereof.

In another embodiment, the additive may be of a nitrile compound selected from the group consisting of acetonitrile, propionitrile, butanenitrile, pentanenitrile, hexanenitrile, hexanedinitrile, pentanedinitrile, butanedinitrile, propanedinitrile, ethanedinitrile, isovaleronitrile, benzonitrile, phenylacetonitrile, cyanogen chloride, hydrogen cyanide, ethanedinitrile, and any combination thereof.

In an exemplary electrochemical device using a liquefied gas electrolyte composed of one or more liquefied gas components with any combination of one or more liquid components, one or more solid components, or one or more salt components, the electrodes are composed of any combination of two electrodes of intercalation type such as carbons life graphite, graphene, graphene oxide, carbon, activated carbon, or lithium titanate, titanium disulfide, molybdenum disulfide, lithium iron phosphate, lithium cobalt phosphate, lithium nickel phosphate, lithium cobalt oxide, lithium nickel manganese oxide, lithium nickel manganese cobalt oxide, lithium nickel cobalt aluminum oxide or chemical reaction electrode such as with chemicals of sulfur, oxygen, carbon dioxide, nitrogen, sulfur dioxide, thionyl fluoride, thionyl chloride fluoride, sulfuryl fluoride, sulfuryl chloride fluoride, carbons like graphene, graphene oxide, or of a metallic electrode with lithium metal or sodium metal or metal alloy including lithium, sodium, tin, aluminum, or any combination thereof. These components may be combined with various binder polymer components including polyvinylidene fluoride, carboxymethyl cellulose, styrene-butadiene rubber, or polytetrafluoroethylene in order to maintain structural integrity of the electrode.

Further, the one or more liquefied gas solvent solution or electrolyte may be combined with one or more salts including one or more of lithium bis(trifluoromethanesulfonyl)imide (LiTFSI), lithium bis(fluorosulfonyl)imide (LiFSI), lithium hexafluorophosphate (LiPF6), lithium perchlorate, lithium hexafluoroarsenate, lithium tetrachloroaluminate, lithium tetragaliumaluminate, lithium bis(oxalato)borate, lithium hexafluorostannate, lithium difluoro(oxalato)borate, lithium bis(fluorosulfonyl)imide, lithium aluminum fluoride, lithium chloroaluminate, lithium tetrafluoroborate, lithium tetrachloroaluminate, lithium difluorophosphate, lithium tetrafluoro(oxalato)phosphate, lithium difluorobis(oxalato)phosphate, lithium borate, lithium oxalate, lithium thiocyanate, lithium tetrachlorogallate, lithium chloride, lithium bromide, lithium iodide, lithium carbonate, lithium fluoride, lithium oxide, lithium hydroxide, lithium nitride, lithium super oxide, lithium azide, lithium deltate, di-lithium squarate, lithium croconate dihydrate, dilithium rhodizonate, lithium oxalate, di-lithium ketomalonate, lithium diketosuccinate or any corresponding salts with the positive charged lithium cation substituted for sodium or magnesium or any combinations thereof. Further useful salts include those with positively charged cations such as tetramethylammonium, tetraethyl ammonium, tetrapropylammonium, tetrabutylammonium, triethylmethylammonium ammonium, N,N-diethyl-N-methyl-N(2methoxyethyl)ammonium, N,N-Diethyl-N-methyl-N-propyl ammonium, N,N-dimethyl-N-ethyl-N-(3-methoxypropyl)ammonium, N,N-Dimethyl-N-ethyl-N-benzylAmmonium, N,N-Dimethyl-N-ethyl-N-phenyl ethyl ammonium, N-Ethyl-N,N-dimethyl-N-(2-methoxyethyl)ammonium, N-Tributyl-N-methylammonium, N-Trimethyl-N-hexylammonium, N-Trimethyl-N-butylammonium, N-Trimethyl-N-propylammonium, 1,3-Dimethylimidazolium, 1-(4-Sulfobutyl)-3-methylimidazolium, 1-Allyl-3H-imidazolium, 1-Butyl-3-methylimidazolium, 1-Ethyl-3-methylimidazolium, 1-Hexyl-3-methylimidazolium, 1-Octyl-3-methylimidazolium, 3-Methyl-1-propylimidazolium, H-3-Methylimidazolium, Trihexyl(tetradecyl)phosphonium, N-Butyl-N-methylpiperidinium, N-Propyl-N-methylpiperidinium, 1-Butyl-1-Methylpyrrolidinium, 1-Methyl-1-(2-methoxyethyl)pyrrolidinium, 1-Methyl-1-(3-methoxypropyl)pyrrolidinium, 1-Methyl-1-octylpyrrolidinium, 1-Methyl-1-pentylpyrrolidinium, N-Propyl- or N-methylpyrrolidinium paired with negatively charged anions such as acetate, bis(fluorosulfonyl)imide, bis(oxalate)borate, bis(trifluoromethanesulfonyl)imide, bromide, chloride, dicyanamide, diethyl phosphate, hexafluorophosphate, hydrogen sulfate, iodide, methanesulfonate, methyl-phophonate, tetrachloroaluminate, tetra fluoroborate, and trifluoromethanesulfonate.

EXAMPLES

In contrast to conventional electrolyte liquid solvents, liquefied gas solvents, which have a vapor pressure substantially higher than standard pressure at room temperature, may have a minimal solubility of salts which limit device performance. The addition of certain chemical additives substantially increases solubility of salts in the liquefied gas electrolytes, which increases performance of electrochemical devices. The increase in solubility is observed with a minimal equal molar ratio of additive-to-salt ratio.

Example 1

Figure 2:
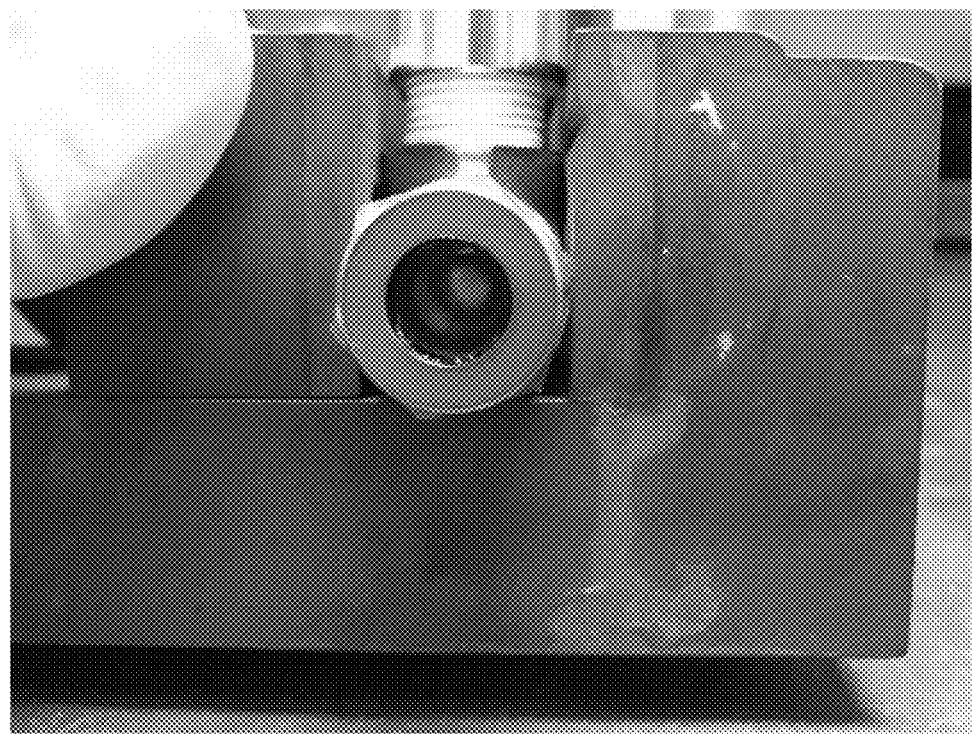
FIG. 2 shows a high-pressure window cell containing a mixture of 0.3 M LiTFSI salt and 0.3 M tetrahydrofuran in a fluoromethane liquefied gas solvent.

The solubility of lithium salts was examined in fluoromethane. The solubility was visually examined via high pressure sight glass window. FIG. 1 shows the solubility of the salt lithium bis(trifluoromethanesulfonyl)imide in fluoromethane at a concentration of 0.3 moles salt per liter (0.3 M) at room temperature. The majority of salt remains non-dissolved. However, it is known a small amount of salt does dissolve at concentrations less than 0.3 M to form a conductive solution, since functional battery devices have been constructed and show high performance. In order to improve solubility of salts, an additional additive may be added to the solution to improve salt disassociation. FIG. 2 shows a solution of 0.3M LiTFSI+0.3M tetrahydrofuran, a cyclic ether, in fluoromethane. This solution shows excellent solubility of LiTFSI salt, even with only equal molar ratios of tetrahydrofuran to salt at room temperature. This solution has the advantage of utilizing fluoromethane solvent benefits as a solvent, including, low temperature performance of devices, low viscosity for high ion mobility, with the benefits of tetrahydrofuran, which is good for the disassociation of lithium salts and the high reduction resistance at low potentials. It is also known to show high performance with lithium metal due to the preferred electrode interface that is formed in tetrahydrofuran-containing electrolytes.

Example 2

Similar to Example 1, several additional additives in place of tetrahydrofuran have been used to improve the solubility of LiTFSI in fluoromethane; select additives that are tested include acetonitrile, ethylene carbonate, dimethyl carbonate, dimethoxyethane, fluoroethylene carbonate, among several others. Salt concentrations in these experiments vary from 0.1 M to 1M with high solubility of LiTFSI and the additive in an equal molar concentration in fluoromethane. These solutions generally showed high solubility and good miscibility without phase separation from temperatures from as low as −78° C. up to around +40° C., where two phase separation may occur in some instances.

Example 3

Sulfuryl fluoride is a relatively non-reactive gas and is used in the fumigant industry. It has limited solubility in most organic solvents but is miscible with fluoromethane, as examined with a high pressure window cell similar to FIG. 1 and FIG. 2. A mixture of 0.3M LiTFSI and 0.3 M tetrahydrofuran was added to a mixed solvent solution of 2 parts by volume fluoromethane and 1 part volume sulfuryl fluoride. This solution shows a distinct liquid line separating two phases, presumably a mixed LiTFSI-tetrahydrofuran-fluoromethane solution in one phase and a fluoromethane-sulfuryl fluoride solution in the second phase. In place of the tetrahydrofuran additive, dimethoxyethane was used in a solution comprising 0.3M LiTFSI and 0.3 M dimethoxyethane and added to a mixed solvent solution of 2 parts by volume fluoromethane and 1 part sulfuryl fluoride. This solution mixed well. This solution may be useful in primary battery devices using sulfuryl fluoride as a catholyte.

Example 4

Figure 3:
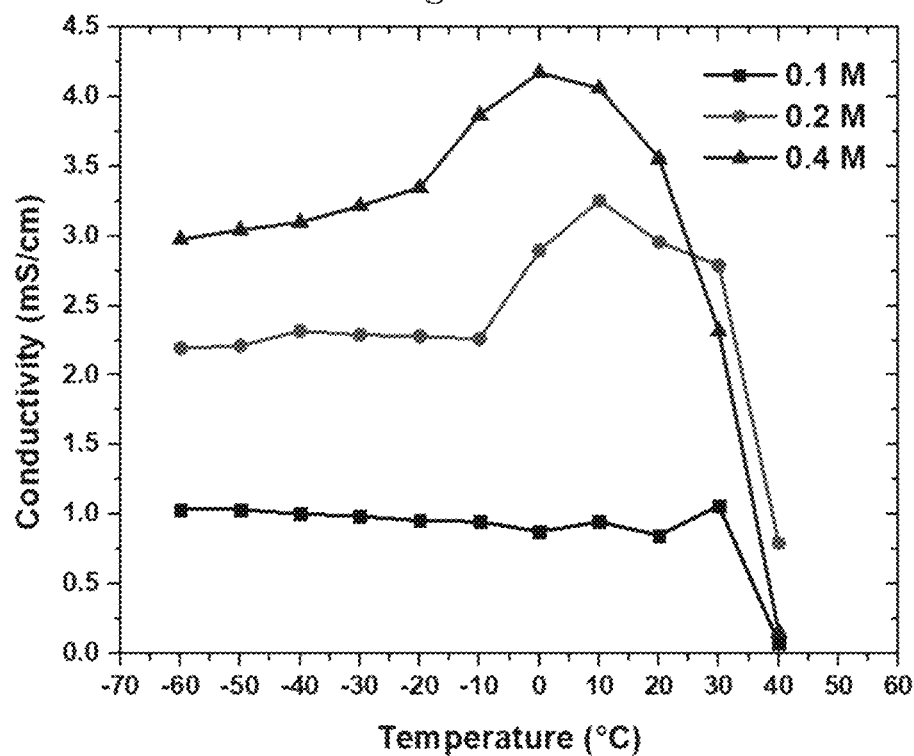
FIG. 3 illustrates conductivities as a function of temperature for an electrolyte solution of LiTFSI and tetrahydrofuran in equal molar concentration of 0.1 M, 0.2 M and 0.4 M in fluoromethane liquefied gas electrolyte.

Conductivity measurements were conducted for solution having various concentration of LiTFSI and tetrahydrofuran (THF) in fluoromethane ($CH_3F$). FIG. 3 shows the electrolytic conductivity of solutions composed of 0.1, 0.2 and 0.4 M LiTFSI with equal molar concentration tetrahydrofuran in fluoromethane. The conductivity of these solutions increases steadily with increasing concentration, as expected when salt is fully solubilized into solution. The maximum conductivity approaches around 4 mS/cm at a concentration of 0.4M LiTFSI with 0.4M THF in fluoromethane. Further, the high temperature limit remains around +44° C. due to the super critical point of fluoromethane. Upon cooling, salt is naturally solubilized back into solution, and conductivity returns back to nominal. Excellent low temperature conductivity remains at temperatures as low as −60° C., demonstrating the excellent performance possible when used in electrochemical devices at low temperatures.

Example 5

Figure 4:
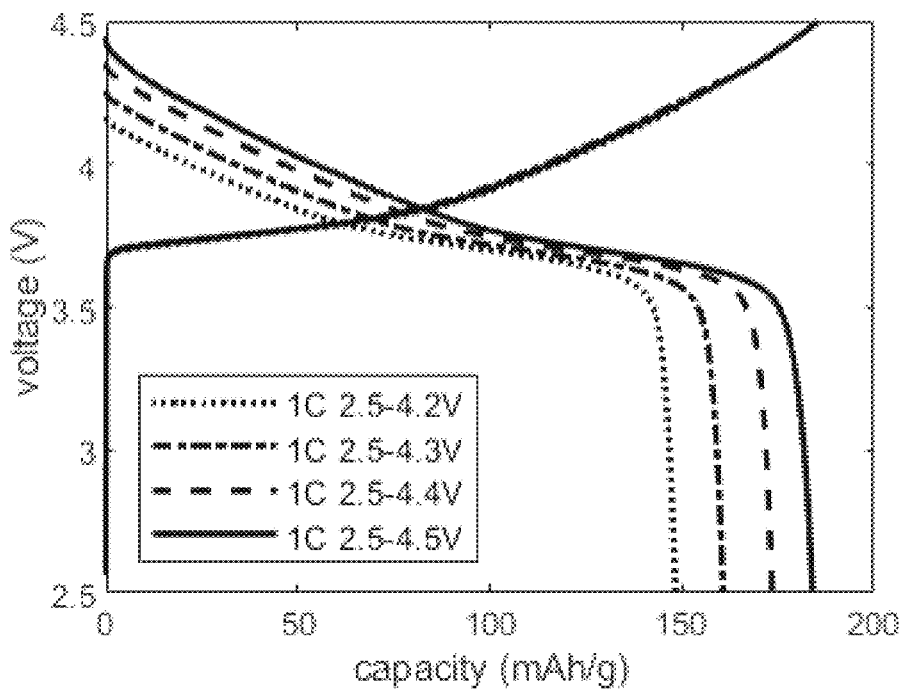
FIG. 4 illustrates charge-discharge profile of an NMC622 cathode at various charge voltages using an electrolyte composed of 1 M LiTFSI and 1 M dimethyl ether in 9 parts fluoromethane and 1 part carbon dioxide.

A cell composed of an NMC622 cathode (LiNi0.6Mn0.2Co0.2O2) and Li metal anode was constructed with electrolyte composed of 1 M LiTFSI and 1 M dimethyl ether in 9 parts fluoromethane and 1 part carbon dioxide. The cell was charged and discharged to various potentials from 4.2 to 4.5 V vs. Li. Discharge capacity per gram active cathode was as expected from 150~180 mAh/g. Performance is shown in FIG. 4.

Example 6

Figure 5:
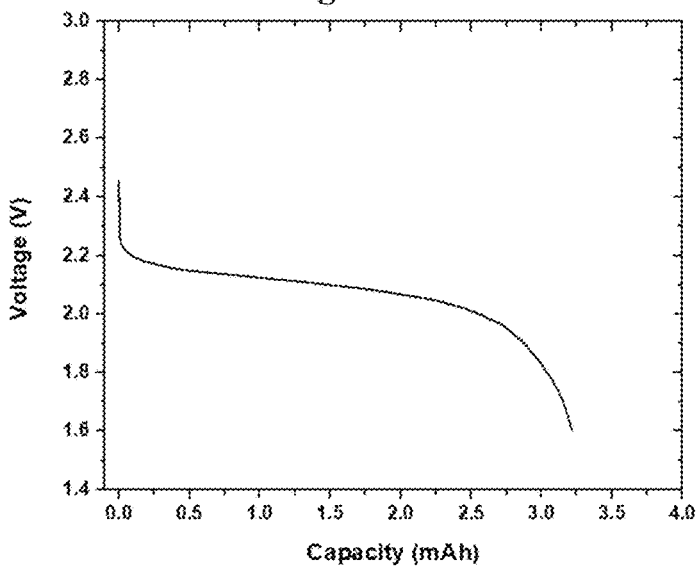
FIG. 5 illustrates cell discharge performance of a carbon and sulfur cathode with lithium metal anode using 1 M LiTFSI and 0.9 M acetonitrile in 19 parts by volume fluoromethane and 1 part by volume carbon dioxide.

An electrochemical cell composed of a lithium metal anode and a cathode comprised of a mixture of sulfur and carbon was formed and tested with an electrolyte comprised of 1 M LiTFSI and 0.9 M acetonitrile in 19 parts by volume fluoromethane and 1 part by volume carbon dioxide. This cell has approximately 5 mAh/cm2 capacity and was discharged at approximately a 50 uA rate at room temperature with discharge performance shown in FIG. 5. Performance was fair but required a low discharge rate to extract high capacity.

Example 7

Figure 6:
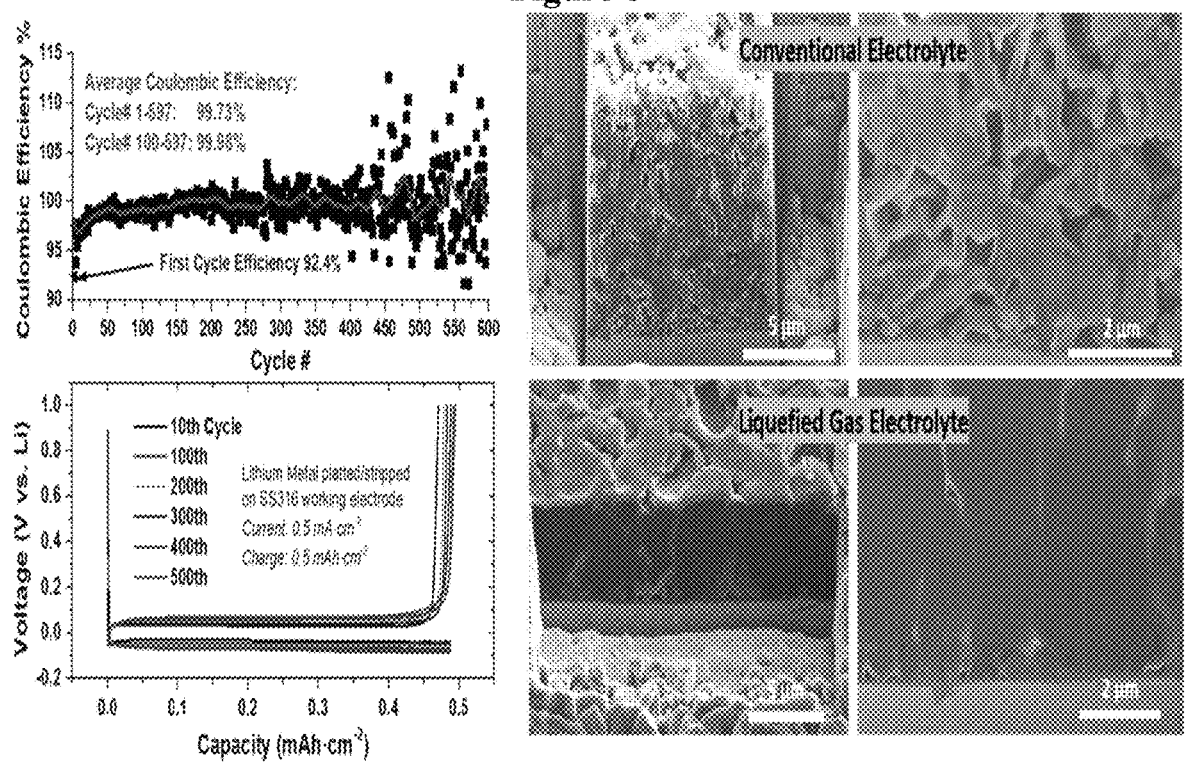
FIG. 6 compares Coulombic efficiency of a cell using conventional electrolyte (upper panel) with a cell using an electrolyte composed of 0.3M LiTFSI and 0.3M tetrahydrofuran in 19 parts by volume fluoromethane and 1 part by volume carbon dioxide (bottom panel). Each of the cells was composed of a lithium metal counter electrode and a stainless steel working electrode.

The use of a lithium metal anode could substantially increase the energy density of battery devices, however, require a significant improvement in efficiency to make a useful device. Cells composed of a lithium metal electrode and a stainless steel counter electrode were built and used to test lithium metal plating and stripping efficiency of lithium metal. Electrolyte solutions of 0.3M LiTFSI and 0.3M tetrahydrofuran in 19 parts by volume fluoromethane and 1 part by volume carbon dioxide were used. These cells were used to plate 0.5 mAh/cm2 lithium metal onto the stainless-steel working electrode at a current of 0.5 mA/cm2 at room temperature over several hundred cycles. A high voltage cutoff of 1V was used for a stripping limit, upon which the current was reversed, and plating resumed. As seen in FIG. 6, the average coulombic efficiency of this cell shows an impressive 99.73% over nearly 600 cycles. This is a surprisingly high efficiency and shows substantial improvement over conventional electrolytes which rarely show efficiencies over ~98%. A constant over potential of approximately 60 mV is also seen and grows little over cycling. Cryogenic scanning electron microscopy images of comparative cells after one cycle of plating using conventional liquid electrolyte (1M $LiPF_6$ in ethylene carbonate:dimethyl carbonate 1:1 by mass) and the above described liquefied gas electrolyte solution. The SEMs shows a comparatively highly smooth surface and dense volume for the liquefied gas electrolyte system as compared to the conventional liquid electrolyte system. This smooth surface demonstrates little dendritic growth, and the highly dense platted volume is a result of the relatively high coulombic efficiency of this cell.

This high efficiency lithium metal anode may be paired with a variety of cathodes to form a very high energy cell.

Example 8

Figure 7:
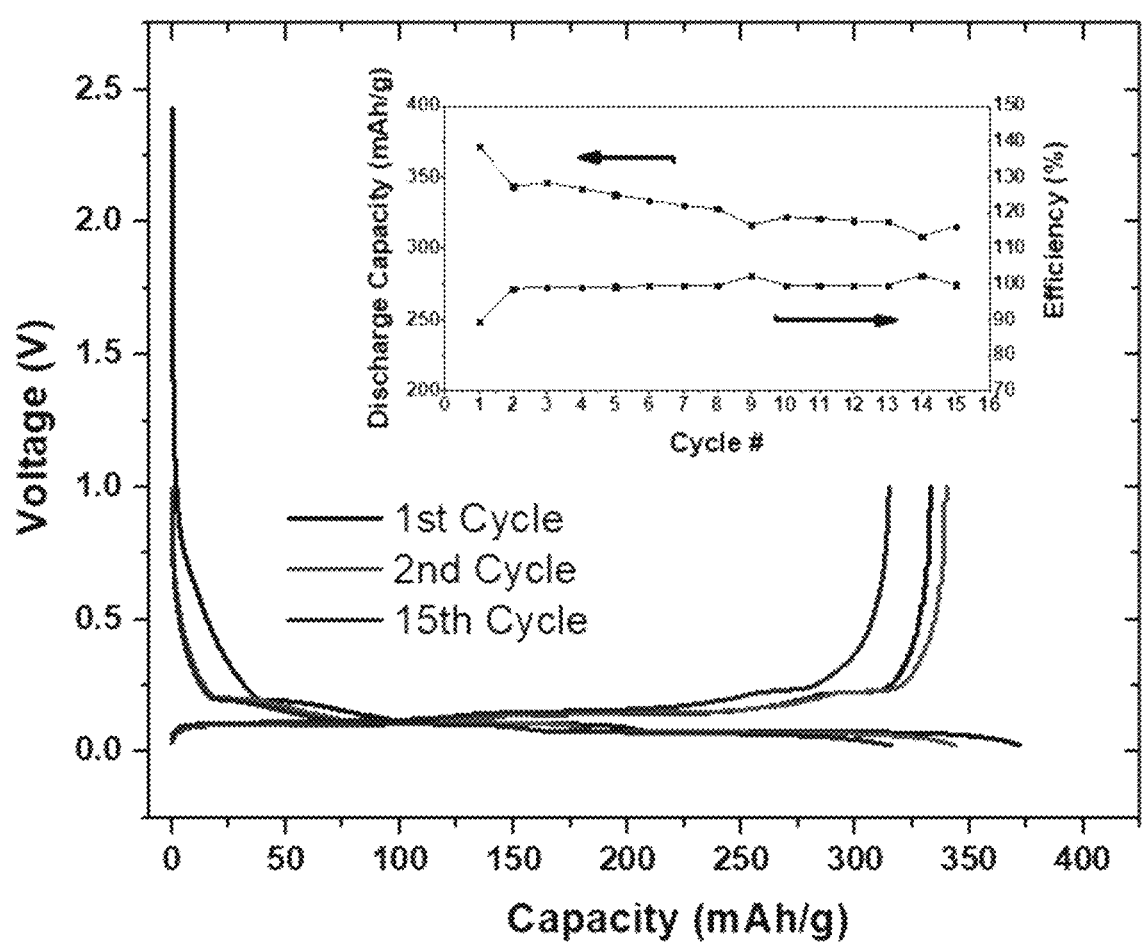
FIG. 7 illustrates charge and discharge characteristics of a cell using a lithium metal anode and graphite cathode using an electrolyte composed of 0.3M LiTFSI and 0.3M tetrahydrofuran in 19 parts by volume fluoromethane and 1 part by volume carbon dioxide.

A cell comprised of a lithium metal anode and a graphite cathode was used to test the ability of the liquefied gas electrolyte to form a stable solid electrolyte interphase on the graphite electrode. An electrolyte solution of 0.3M LiTFSI and 0.3M tetrahydrofuran in 19 parts by volume fluoromethane and 1 part by volume carbon dioxide were used. The cell cycled fairly well over tens of cycles, however, capacity did drop over cycling, as shown in FIG. 7.

Example 9

Figure 11:
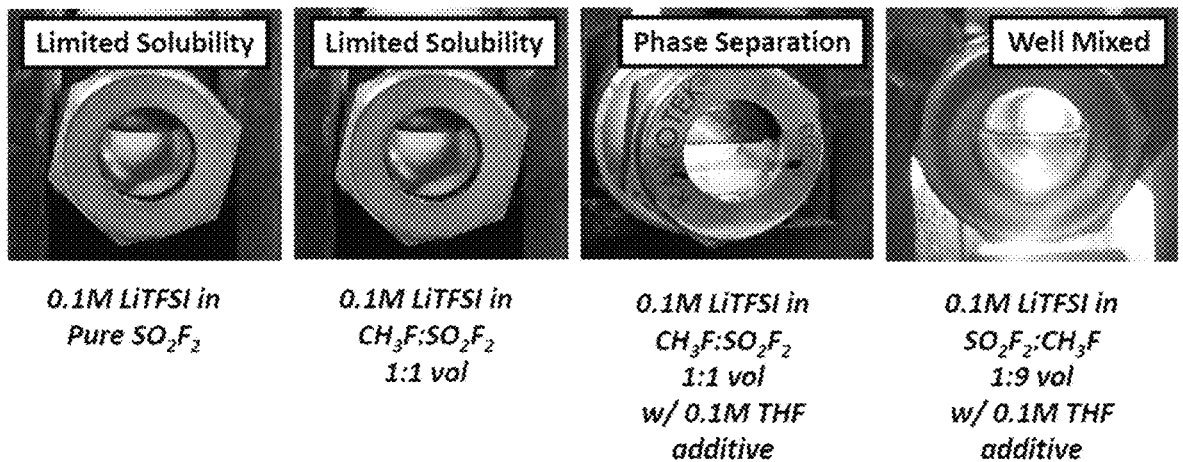
FIG. 11 shows a high-pressure window cell containing a mixture of 0.1 M LiTFSI salt in liquefied gas solvents. The majority of salt was well-dissolved inside this solution of liquefied gas electrolyte.
Figure 12:
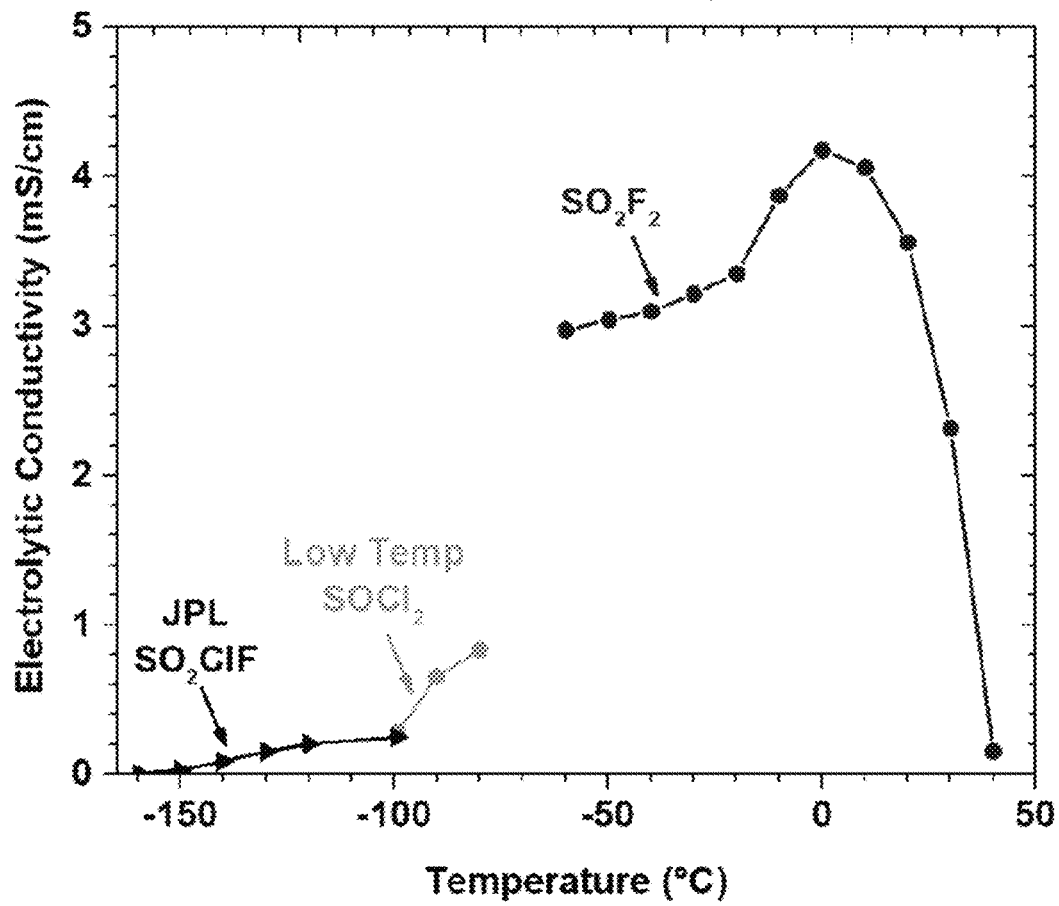
FIG. 12 illustrates electrolyte conductivities of two types of liquefied gas electrolyte and of a liquid $SOCl_2$ based electrolyte.

The solubility lithium salts were examined in sulfuryl fluoride, a mixture of fluoromethane and sulfuryl fluoride, and mixtures of fluoromethane, sulfuryl fluoride with a THF additive. The solubility was visually examined via high pressure sight glass window. FIG. 11 shows the solubility of the salt lithium bis(trifluoromethanesulfonyl)imide in sulfuryl fluoride at a concentration of 0.1 moles salt per liter (0.1 M) at room temperature. The same concentration of salt dissolved in a mixture of fluoromethane, sulfuryl fluoride (1:9) with 0.1 M THF additive. Electrolytic conductivity measurements of these solutions are shown in FIG. 12.

Example 10

Figure 13:
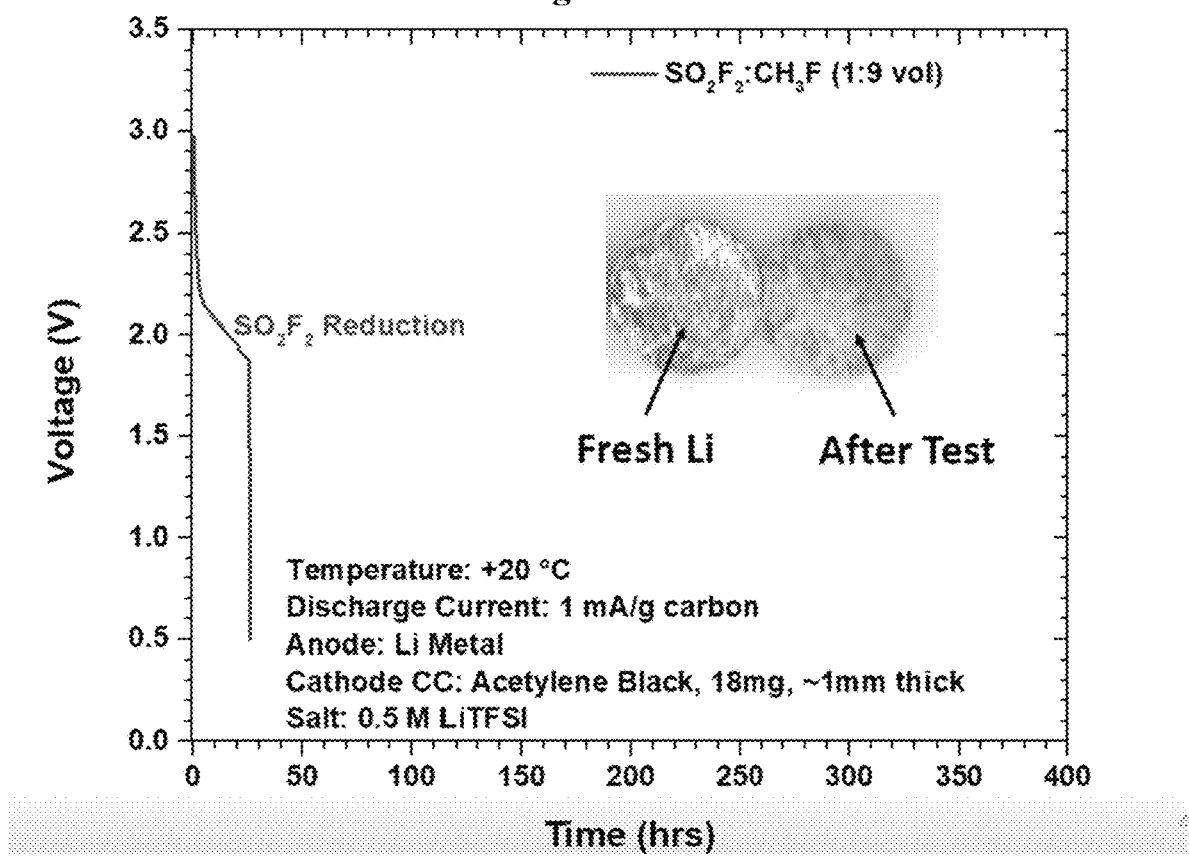
FIG. 13 illustrates cell discharge performance of a carbon cathode with lithium metal anode using 0.5 M LiTFSI and fluoromethane and $SO_2F_2$.

An electrochemical cell composed of a lithium metal anode and a cathode comprised of carbon was formed and tested with an electrolyte comprised of 0.5 M LiTFSI and fluoromethane to sulfuryl fluoride (1:9 vol). This cell was discharged at approximately a 1 mA/g rate at room temperature, with the discharge performance shown in FIG. 13.

Example 11

Figure 14:
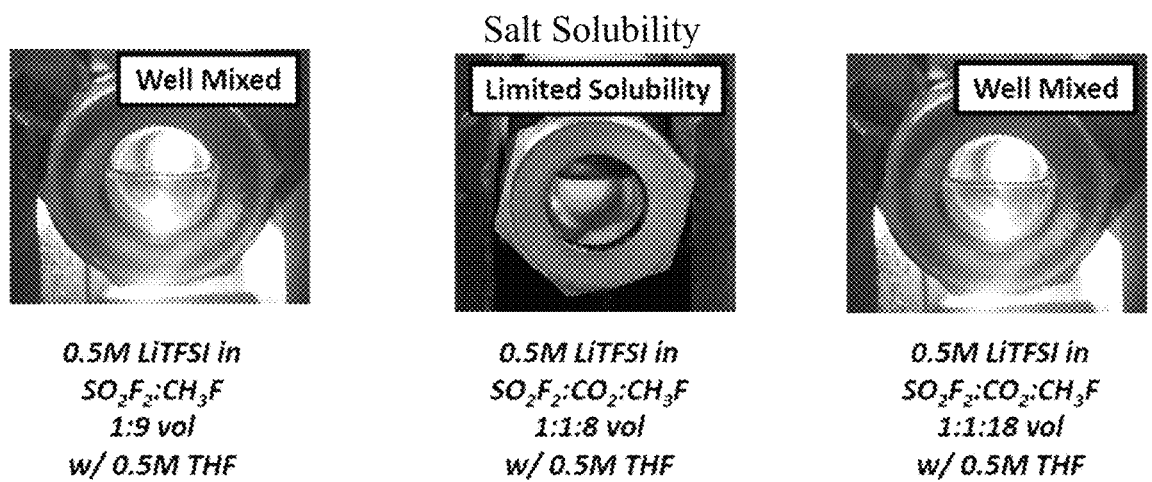
FIG. 14 shows a high-pressure window cell containing a mixture of 0.5 M LiTFSI salt in several liquefied gas solvents. The majority of salt was well-dissolved inside this solution of liquefied gas electrolyte.

The solubility lithium salts was examined in a mixture of fluoromethane and sulfuryl fluoride, a mixture of fluoromethane, carbon dioxide, and sulfuryl fluoride. THF was added as an additive. FIG. 14 shows the solubility of the salt lithium bis(trifluoromethanesulfonyl)imide in the various solvents at a concentration of 0.5 moles salt per liter (0.5 M) at room temperature.

Example 12

Figure 15:
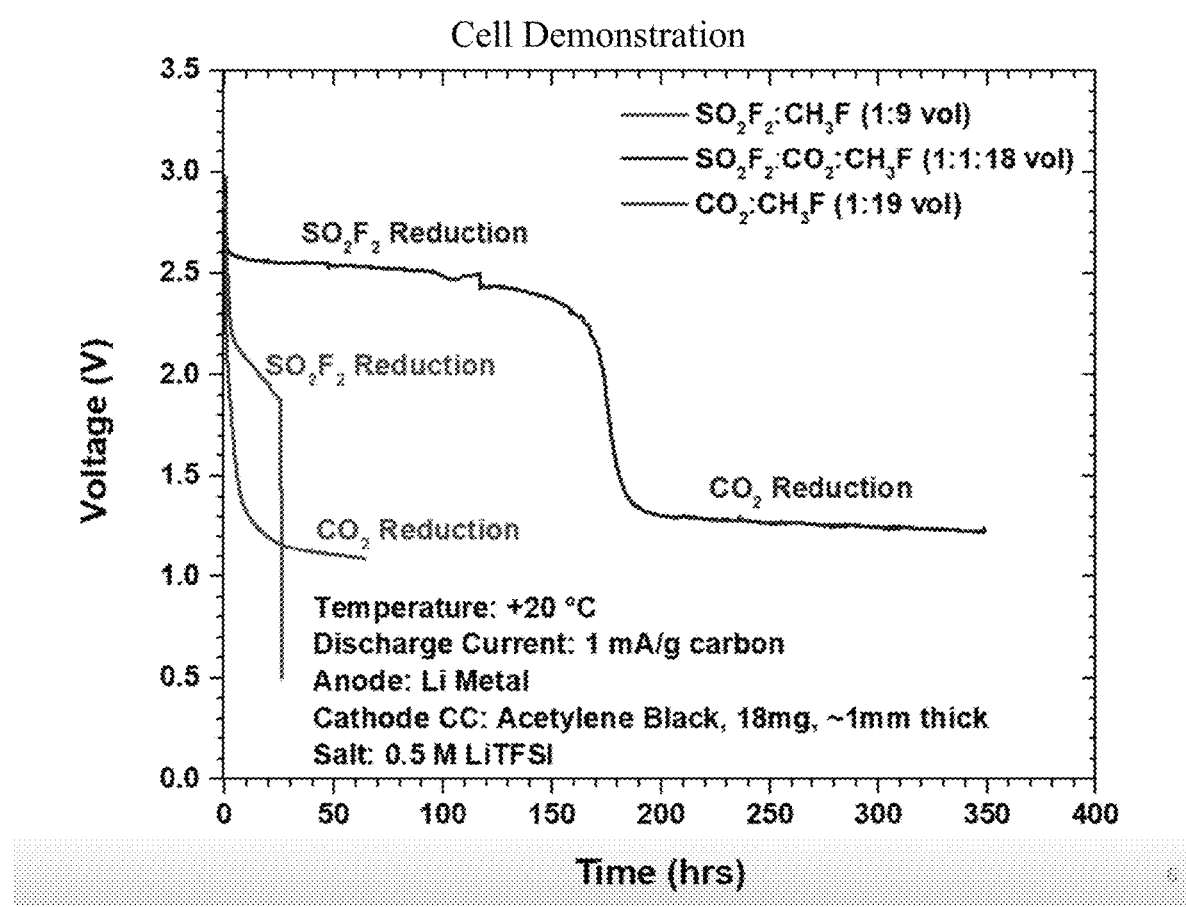
FIG. 15 illustrates cell discharge performance of a carbon cathode with lithium metal anode using 0.5 M LiTFSI and fluoromethane, $SO_2F_2$ and $CO_2$.
Figure 16:
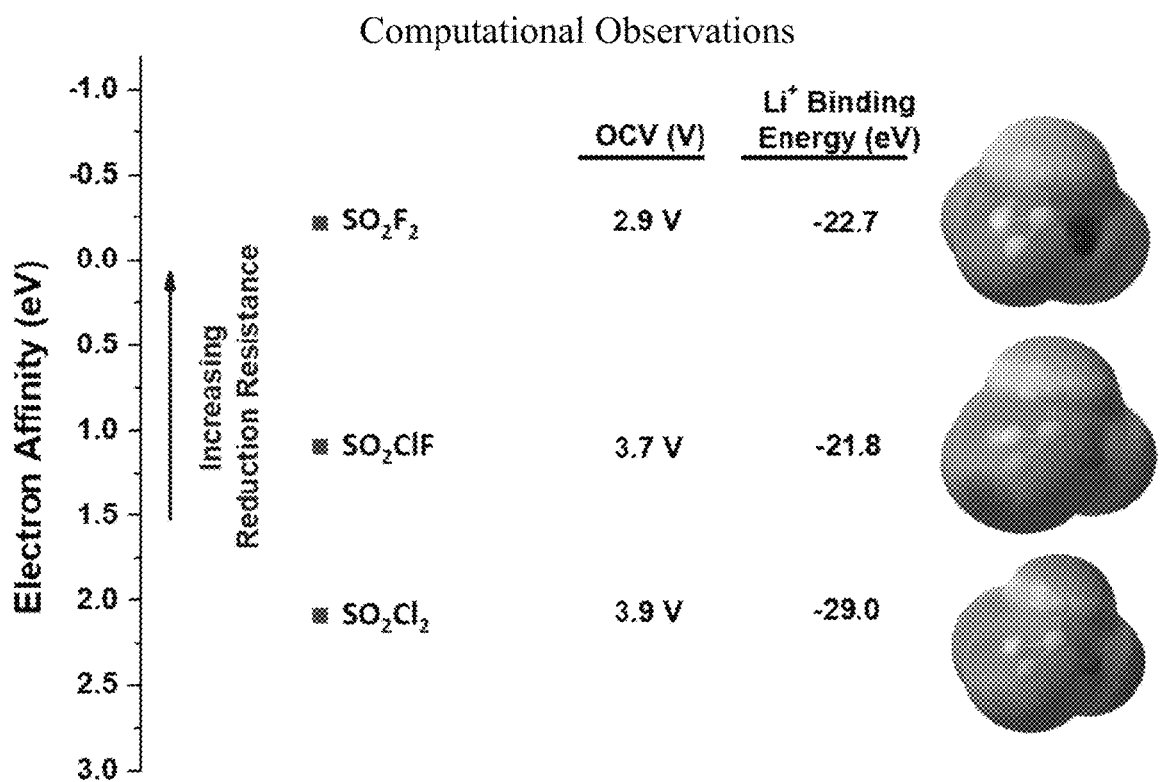
FIG. 16 illustrates computational observations of the electron affinities of $SO_2F_2$, $SO_2Cl_2$, and $SO_2Cl_2$.
Figure 17:
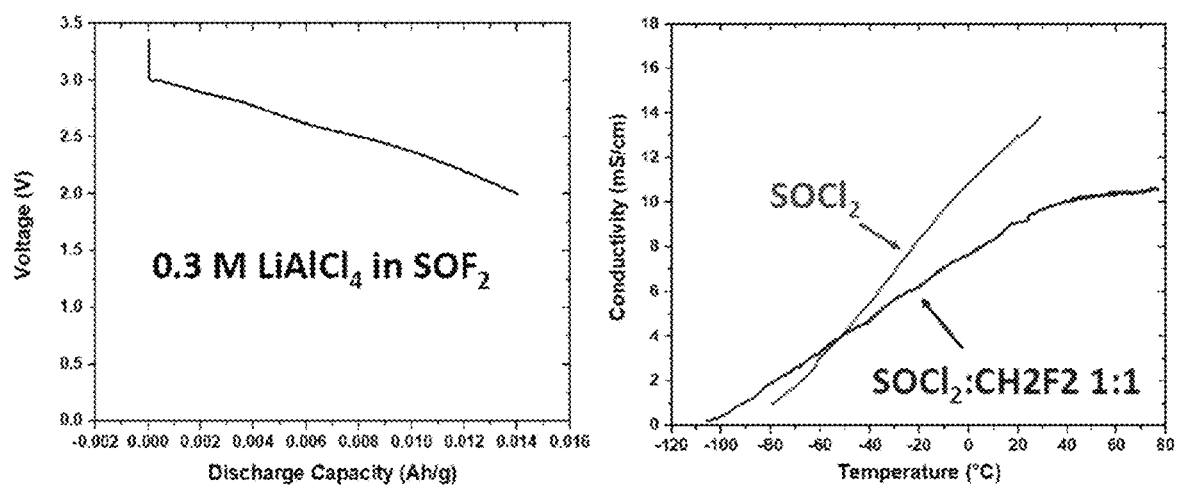
FIG. 17 illustrates additional catholyte work using liquefied gas co-solvents with thionyl halides such as $SOF_2$ and $SOCl_2$.

An electrochemical cell composed of a lithium metal anode and a cathode current collector comprised of carbon was formed and tested with an electrolyte comprised of 0.5 M LiTFSI and a mixture of fluoromethane to sulfuryl fluoride (1:9 vol), a mixture of sulfuryl fluoride, carbon dioxide, and fluoromethane (1:1:18 vol), and a mixture of carbon dioxide and fluoromethane (1:19 vol). This cell was discharged at approximately a 1 mA/g rate at room temperature, with the discharge performance shown in FIG. 15.

Although exemplary embodiments and applications of the invention have been described herein including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

The invention claimed is:

1. A rechargeable electrochemical device, comprising:
   an ionically conducting electrolyte comprising a liquefied gas solvent and one or more additives;
   a housing enclosing the ionically conducting electrolyte and structured to provide a pressurized condition to the liquefied gas solvent; and
   at least two conducting electrodes in contact with the ionically conducting electrolyte;
   wherein:
   the liquefied gas electrolyte operates at a vapor pressure above an atmospheric pressure of 100 kPa at a room temperature of 293.15 K; and
   the liquefied gas electrolyte is capable of being placed under a compressive pressure equal to, or greater than, the liquefied gas electrolyte's vapor pressure at room temperature when the compressive pressure is applied, thereby keeping the liquefied gas electrolyte in a liquid phase.

2. The rechargeable electrochemical device of claim 1, wherein the one or more additives comprise a non-cyclic carbonate compound.

3. The rechargeable electrochemical device of claim 2, wherein the non-cyclic carbonate compound is selected from the group consisting of dimethyl carbonate, ethyl methyl carbonate, propyl methyl carbonate, butyl methyl carbonate, diethyl carbonate, propyl ethyl carbonate, butyl ethyl carbonate, dipropyl carbonate, propyl butyl carbonate, dibutyl carbonate, fluoromethyl methyl carbonate, difluoromethyl methyl carbonate, trifluoromethyl methyl carbonate, bis(fluoromethyl) carbonate, bis(difluoromethyl) carbonate, bis(trifluoromethyl) carbonate, fluoromethyl ethyl carbonate, difluoromethyl ethyl carbonate, trifluoromethyl ethyl carbonate, fluoroethyl ethyl carbonate, difluoroethyl ethyl carbonate, trifluoroethyl ethyl carbonate, tetrafluoroethyl ethyl carbonate, pentafluoroethyl ethyl carbonate, hexafluoroethyl ethyl carbonate, bis(fluoroethyl) carbonate, bis(difluoroethyl) carbonate, bis(trifluoroethyl) carbonate, bis(tetrafluoroethyl) carbonate, bis(pentafluoroethyl) carbonate, bis(hexafluoroethyl) carbonate, and any combination thereof.

4. The rechargeable electrochemical device of claim 1, wherein the one or more additives comprises a non-cyclic ether compound.

5. The rechargeable electrochemical device of claim 4, wherein the non-cyclic ether compound is selected from the group consisting of: methyl propyl ether, methyl butyl ether, diethyl ether, ethyl propyl ether, ethyl butyl ether, dipropyl ether, propyl butyl ether, dibutyl ether, ethyl vinyl ether, divinyl ether, glyme, diglyme, triglyme, tetraglyme, 1,1,2,2-tetrafluoro-3-(1,1,2,2-tetrafluoroethoxy)-propane, trifluoro(trifluoromethoxy)methane, perfluoroethyl ether, fluoromethyl methyl ether, difluoromethyl methyl ether, trifluoromethyl methyl ether, bis(fluoromethyl) ether, bis(difluoromethyl) ether, fluoroethyl methyl ether, difluoroethyl methyl ether, trifluoroethyl methyl ether, bis(fluoroethyl) ether, bis(difluoroethyl) ether, bis(trifluoroethyl) ether, 2-fluoroethoxymethoxyethane, 2,2-difluoroethoxymethoxyethane, methoxy-2,2,2-trifluoroethoxyethane, ethoxy-2-fluoroethoxyethane, 2,2-difluoroethoxyethoxyethane, ethoxy-2,2,2-trifluoroethoxyethane, methyl nonafluorobutyl ether, ethyl nonafluorobutyl ether, 2-fluoroethoxymethoxyethane, 2,2-difluoroethoxymethoxyethane, methoxy-2,2,2-trifluoroethoxyethane, ethoxy-2-fluoroethoxyethane, 2,2-difluoroethoxyethoxyethane, ethoxy-2,2,2-trifluoroethoxyethane, bis(trifluoro)methyl ether, dimethyl ether, methyl ethyl ether, methyl vinyl ether, perfluoromethyl-vinylether, and any combination thereof.

6. The rechargeable electrochemical device of claim 1, wherein the one or more additives comprises a cyclic ether compound.

7. The rechargeable electrochemical device of claim 6, wherein the cyclic ether compound is selected from the group consisting of: propylene oxide, tetrahydrofuran, tetrahydropyran, furan, 12-crown-4, 12-crown-5, 18-crown-6, 2-methyltetrahydrofuran, 1,3-dioxolane, 1,4-dioxolane, 2-methyloxolane, (1,2-propylene oxide), ethylene oxide, octafluorotetrahydrofuran, and any combination thereof.

8. The rechargeable electrochemical device of claim 1, wherein the one or more additives comprises a nitrile compound.

9. The rechargeable electrochemical device of claim 8, wherein the nitrile compound is selected from the group consisting of: acetonitrile, propionitrile, butanenitrile, pentanenitrile, hexanenitrile, hexanedinitrile, pentanedinitrile, butanedinitrile, propanedinitrile, ethanedinitrile, isovaleronitrile, benzonitrile, phenylacetonitrile, cyanogen chloride, hydrogen cyanide, ethanedinitrile, and any combination thereof.

10. The rechargeable electrochemical device of claim 1, wherein the liquefied gas solvent comprises one or more materials selected from the group consisting of: fluoromethane, difluoromethane, sulfuryl fluoride, sulfuryl chloride, carbon dioxide, 1,1-difluoroethane, chloromethane, nitrous oxide, and a combination thereof.

11. The rechargeable electrochemical device of claim 1, wherein the one or more additives comprises a cyclic carbonate compound.

12. The rechargeable electrochemical device of claim 11, wherein the cyclic carbonate compound is selected from the group consisting of: vinyl carbonate, ethylene carbonate, propylene carbonate, 1,2-butylene carbonate, trans-butylene carbonate, fluoroethylene carbonate, difluoroethylene carbonate, trifluoroethylene carbonate, tetrafluoroethylene carbonate, chloroethylene carbonate, dichloroethylene carbonate, trichloroethylene carbonate, tetrachloroethylene carbonate, fluoromethyl ethylene carbonate, difluoromethyl ethylene carbonate, trifluoromethyl ethylene carbonate, bis (fluoromethyl) ethylene carbonate, bis(difluoromethyl) ethylene carbonate, bis(trifluoromethyl) ethylene carbonate, and any combination thereof.

13. The rechargeable electrochemical device of claim 3, wherein the liquefied gas solvent comprises fluoromethane, sulfuryl fluoride, and/or carbon dioxide.

14. The rechargeable electrochemical device of claim 1, wherein the one or more additives comprises acetonitrile, tetrahydrofuran, and/or dimethyl ether.

15. The rechargeable electrochemical device of claim 1, further comprising one or more lithium salts.

16. The rechargeable electrochemical device of claim 1, wherein the electrochemical device is a rechargeable battery, ultracapacitor, or supercapacitor.

17. The rechargeable electrochemical device of claim 16, wherein the rechargeable battery is a lithium ion battery or lithium metal battery.

18. The rechargeable electrochemical device of claim 1, wherein the electrodes comprise one or more of graphite, carbon, graphene, graphene oxide, activated carbon, lithium titanate, titanium disulfide, molybdenum disulfide, lithium iron phosphate, lithium cobalt phosphate, lithium nickel phosphate, lithium cobalt oxide, lithium nickel manganese oxide, lithium nickel manganese cobalt oxide, and lithium nickel cobalt aluminum oxide.

19. The rechargeable electrochemical device of claim 1, wherein the electrodes are metallic electrodes and comprise one or more of lithium metal, sodium metal or a metal alloy including lithium, sodium, tin, aluminum, or any combination thereof.

20. The rechargeable electrochemical device of claim 16, wherein the electrodes further comprise various binder polymer components selected from the group consisting of: polyvinylidene fluoride, carboxymethyl cellulose, styrene-butadiene rubber, and polytetrafluoroethylene.

21. A rechargeable lithium battery, comprising:
an ionically conducting electrolyte comprising a liquefied gas solvent and one or more additives selected from the group consisting of: non cyclic carbonate, cyclic carbonate, non-cyclic ether, cyclic ether, nitrile, and combinations thereof;
a housing enclosing two conducting electrodes and the ionically conducting electrolyte, wherein the liquefied gas electrolyte operates at a vapor pressure above an atmospheric pressure of 100 kPa at a room temperature of 293.15 K and the liquefied gas electrolyte is capable of being placed under a compressive pressure equal to, or greater than, the liquefied gas electrolyte's vapor pressure at room temperature when the compressive pressure is applied, thereby keeping the liquefied gas electrolyte in a liquid phase.

22. The rechargeable lithium battery of claim 21, wherein the liquefied gas solvent comprises one or more materials selected from the group consisting of: fluoromethane, difluoromethane, sulfuryl fluoride, sulfuryl chloride, carbon dioxide, 1,1-difluoroethane, chloromethane, nitrous oxide, and a combination thereof.

* * * * *